United States Patent
Scharkowski

(10) Patent No.: US 11,489,271 B2
(45) Date of Patent: Nov. 1, 2022

(54) ELECTRICAL CONNECTION CONSOLE FOR A MOTOR-VEHICLE ELECTRICAL SYSTEM CONDUCTOR

(71) Applicant: Auto-Kabel Management GmbH, Hausen i.W. (DE)

(72) Inventor: Oliver Scharkowski, Cottbus (DE)

(73) Assignee: Auto-Kabel Management GmbH, Hausen i.W. (DE)

(*) Notice: Subject to any disclaimer, the term of this patent is extended or adjusted under 35 U.S.C. 154(b) by 0 days.

(21) Appl. No.: 17/609,963

(22) PCT Filed: Apr. 29, 2020

(86) PCT No.: PCT/EP2020/061854
§ 371 (c)(1),
(2) Date: Nov. 9, 2021

(87) PCT Pub. No.: WO2020/229173
PCT Pub. Date: Nov. 19, 2020

(65) Prior Publication Data
US 2022/0149547 A1    May 12, 2022

(30) Foreign Application Priority Data
May 10, 2019   (DE) .................. 10 2019 112 328.3

(51) Int. Cl.
*H01R 11/11* (2006.01)
*B23K 20/12* (2006.01)
(Continued)

(52) U.S. Cl.
CPC ............ *H01R 11/11* (2013.01); *B23K 20/127* (2013.01); *B23K 20/129* (2013.01);
(Continued)

(58) Field of Classification Search
CPC ..................................................... H01R 11/11
See application file for complete search history.

(56) References Cited

U.S. PATENT DOCUMENTS 8,246,390 B2 *   8/2012   Cecil .................... H01R 4/70
                                                     439/810
8,288,653 B2 *  10/2012   Stroh .................. H01R 4/187
                                                     174/88 R
(Continued)

FOREIGN PATENT DOCUMENTS

DE          100 07 258 A1    8/2001
DE    10 2006 050 708 A1    5/2008
(Continued)

OTHER PUBLICATIONS

International Searching Authority/EP, International Search Report and Written Opinion of the International Searching Authority, Application No. PCT/EP2020/061854, dated Jul. 14, 2020, 13 pages (with English translation of the international search report).
(Continued)

*Primary Examiner* — Ross N Gushi
(74) *Attorney, Agent, or Firm* — Sunstein LLP

(57) ABSTRACT

Electrical connection console for a motor vehicle board net comprising a cable 2 with a metallic stranded conductor 4, and an electrical tap electrically and mechanically connected to the stranded conductor 4, characterized in that the tap is formed from a metallic sleeve 10, in that the sleeve 10 is connected to the stranded conductor 4 in a connection region 8 of the stranded conductor 4, and in that the sleeve 10 has a longitudinal extent in a longitudinal axis parallel to a longitudinal axis of the stranded conductor 4, in that the sleeve 10 has a recess 26 whose longitudinal axis runs transversely with respect to the longitudinal axis of the sleeve 10, and in that a contact sleeve 28 is arranged in the recess 26.

12 Claims, 13 Drawing Sheets

(51) Int. Cl.
    *B23K 20/227* (2006.01)
    *B23K 20/233* (2006.01)
    *B60R 16/02* (2006.01)
    *H01R 4/02* (2006.01)
    *H01R 4/18* (2006.01)
    *H01R 43/02* (2006.01)
    *B23K 103/10* (2006.01)
    *B23K 103/04* (2006.01)
    *B23K 103/12* (2006.01)
    *B23K 101/38* (2006.01)
    *H01R 4/30* (2006.01)
    *H01R 4/62* (2006.01)
    *H01R 43/058* (2006.01)

(52) U.S. Cl.
    CPC ...... *B23K 20/1265* (2013.01); *B23K 20/2275* (2013.01); *B23K 20/2333* (2013.01); *B60R 16/02* (2013.01); *H01R 4/023* (2013.01); *H01R 4/187* (2013.01); *H01R 43/0207* (2013.01); *B23K 2101/38* (2018.08); *B23K 2103/05* (2018.08); *B23K 2103/10* (2018.08); *B23K 2103/12* (2018.08); *H01R 4/308* (2013.01); *H01R 4/625* (2013.01); *H01R 43/058* (2013.01); *H01R 2201/26* (2013.01)

(56) References Cited

U.S. PATENT DOCUMENTS

| | | |
|---|---|---|
| 10,516,220 B2 | 12/2019 | Harms et al. |
| 10,998,645 B2 | 5/2021 | Scharkowski |
| 2016/0250984 A1 | 9/2016 | Gottschlich et al. |
| 2020/0203857 A1 | 6/2020 | Scharkowski |

FOREIGN PATENT DOCUMENTS

| | | |
|---|---|---|
| DE | 10 2013 101 876 B3 | 6/2014 |
| DE | 10 2013 017 660 A1 | 4/2015 |
| DE | 10 2016 105 768 B3 | 3/2017 |
| DE | 10 2017 106 742 B3 | 3/2018 |
| DE | 10 2017 116 879 A1 | 12/2018 |
| KR | 10-2017-0042167 A | 4/2017 |
| WO | 2015/036060 A1 | 3/2015 |

OTHER PUBLICATIONS

International Preliminary Examining Authority/EP, International Preliminary Report on Patentability, Application No. PCT/EP2020/061854, dated Jul. 28, 2021, 53 pages (in German).

German Patent Office, Office Action, Application No. 10 2019 112 328.3, dated Jan. 15, 2020, 6 pages (in German).

* cited by examiner

ELECTRICAL CONNECTION CONSOLE FOR A MOTOR-VEHICLE ELECTRICAL SYSTEM CONDUCTOR

CROSS-REFERENCE TO RELATED APPLICATIONS

This application is the national phase entry of international patent application no. PCT/EP2020/061854 filed Apr. 29, 2020 and claims the benefit of German patent application No. 10 2019 112 328.3, filed May 10, 2019, the disclosures of which are incorporated herein by reference in their entirety.

TECHNICAL FIELD

The subject matter relates to an electrical connection console for a motor vehicle board net line comprising a cable with a metallic conductor and an electrical tap electrically and mechanically connected to the conductor.

BACKGROUND ART

In a motor vehicle board net, it is necessary to implement electrical taps to consumers originating from a main energy line which is directly connected to the positive pole of the battery. Due to the multitude of electrical consumers to be connected in a board net, a wide branching of the board net line is necessary. Some consumers require large power from the battery and must therefore be connected to the distribution network via cables with large conductor cross-sections. Groups of consumers often have to be fused via a common fuse; on the other hand, it is also necessary to provide a plurality of respectively fused line strands originating from the main power line.

Tapping electrical energy from the main energy line poses difficulties. On the one hand, such a tap comes with a contact resistance and thus ohmic losses, and on the other hand, there is an increased risk of corrosion at the taps.

Furthermore, when using aluminium cables, the electrical tap is always subject to the danger that the contact resistance becomes high due to oxidation of the aluminium conductor and that the electrical power loss at this contact resistance leads to undesired heating of the cable.

Based on these problems, the subject-matter was based on the object of providing an electrical connection console that enables a decentralised board net topology.

SUMMARY OF THE INVENTION

In particular in motor vehicle board nets, preferably in those in which the battery is arranged in the rear of the vehicle and the drive engine, in particular the starter of the internal combustion engine, but also possibly an electric motor for the drive, is arranged in the engine compartment, the main battery line runs from the rear to the front of the vehicle. This may be done by routing the battery line under the underbody or by routing the battery line inside the vehicle. Along this battery line, a plurality of electrical outlets may be realised in a particularly simple manner with the aid of the present connection console.

Especially if the battery line is made of an aluminium conductor, in particular an aluminium stranded conductor, it is problematic to arrange connection consoles on such conductors. With the aid of the solution according to the subject matter, it is possible to arrange a sleeve in a non-insulated area, in particular in a central area of the cable distanced from the conductor ends.

The cable on which the connection console is arranged has a metallic stranded conductor as the cable core. In the following, the stranded conductor is also referred to as a conductor.

For contacting with a connecting part, e.g. a connection line, an electrical tap electrically and mechanically connected to the stranded conductor is provided. In the following, a connection cable or a bolt is described as a connecting part as an example. Other connecting parts are also possible, in particular as flat parts, connection lugs, crimp connections or the like.

The tap is formed from a metallic sleeve which is connected with the conductor in a connection region of the conductor, wherein the connection region is arranged between the ends of the cable.

The cable has a longitudinal extension, thus the stranded conductor also has a longitudinal extension. Along this longitudinal extension, the sleeve is applied onto the stranded conductor.

A recess is provided in the sleeve, the longitudinal axis of which is oriented transversely to the longitudinal axis of the sleeve.

A contact sleeve is arranged in the recess for contacting with a connecting part.

The sleeve is preferably pressed in the connection region in such a way that it has two contact surfaces being oriented essentially parallel to each other and that the recess is arranged between the contact surfaces. A first of the contact surfaces may serve as a support for the contact sleeve, in particular its flange. The second contact surface may serve as a support surface for a nut, a connecting part or the like.

The sleeve is in particular placed around the non-insulated area as a splice. If the sleeve is formed as a splice, the sleeve may be laid around the stranded conductor as a cut-to-length metal strip, cut-to-length sheet metal, or it may be laid around the stranded conductor from an endless strip and then cut to length, or laid around the stranded conductor as a one-piece or two-piece sleeve or as a multi-piece sleeve.

A preferred geometry of the sleeve may be, for example, a prefabricated, cut-to-length sheet metal strip. This may be wrapped around the stranded conductor. It is also possible to wrap an endless strip, preferably a sheet metal endless strip, around the stranded conductor and cut it to length after wrapping. The sleeve may in particular be formed as a bimetallic sheet metal strip or bimetallic material.

Sleeve parts, in particular two or more sleeve parts, may also be provided with a matched cross-section for the conductor cross-section of the stranded conductor. In particular, these may have an inner radius corresponding to the radius of the stranded conductor. The sleeve parts may be positioned on the stranded conductor and then be connected to the stranded conductor in a material bond, preferably by means of welding.

It is also possible that a one-piece sleeve, preferably with a round or polygonal inner and/or outer circumference, is fitted around the stranded conductor and positioned at the joint position.

After being positioned on the stranded conductor, a sleeve may be joined to the stranded conductor by means of a suitable joining process in a force-fit, form-fit and/or material-bond manner. In particular, crimping and/or ultrasonic welding is suitable for joining the sleeve to the stranded conductor.

According to an embodiment example, it is proposed that the sleeve is crimped around the stranded conductor. In particular, the sleeve may have an inner circumference corresponding to the outer circumference of the insulation in the area of an insulation of the cable. In particular, the sleeve may be arranged in a gas-tight manner on the insulation.

Also, the sleeve may have at least one outwardly facing flat surface area (contact surface) in the region of the stranded conductor, wherein at least one seam of the sleeve may be arranged in at least one flat surface area. Preferably, at least one seam is formed when the sleeve is joined around the stranded conductor. This seam is only missing when a one-piece sleeve is placed around the stranded conductor. The seam is preferably arranged in an area which is flat after joining and/or pressing, so that in a welding process for joining the sleeve to the stranded conductor in a material bond, the seam may be welded particularly well on the flat surface area.

The sleeve is first placed loosely around the stranded conductor and joined to the stranded conductor at least positively with the aid of suitable plastic deformation processes, such as crimping. In this step, the sleeve may be crimped.

In the area of the insulation, the cable may have a larger diameter than the stranded conductor. When joining the sleeve around the cable, different inner diameters may then be realised by plastically deforming the sleeve in such a way that it rests against the insulation of the cable with a larger inner diameter than the inner diameter that rests against the stranded conductor.

By pressing the sleeve, the outer circumference of the sleeve in particular is deformed. This creates the geometric conditions for a preferably flat surface on the compound structure between the stranded conductor and the sleeve, so that one, preferably two, parallel contact surfaces are formed. After crimping, the inner contour of the sleeve or the inner profile of the sleeve is preferably congruent with the outer contour or the outer profile of the stranded conductor in the area of the removed insulation and in particular also with the outer contour or the outer profile of the cable in the area of the insulation. When the sleeve is formed, it is preferably pressed firmly against the insulation so that preferably a gas-tight bond is formed between the inner wall of the sleeve and the outer wall of the insulation.

During the connecting, the sleeve is preferably first placed around the stranded conductor in a form-fit and then welded to the stranded conductor, in particular ultrasonically welded or resistance welded. With the aid of the welding tools, in particular an anvil and sonotrode in the case of ultrasonic welding or electrodes in the case of resistance welding, it is possible to realise both a positive and a material-locking joining between the sleeve and the stranded conductor. With the help of the tools, the sleeve may first be formed in such a way that a positive fit is formed between the sleeve and the stranded conductor. Preferably, this creates a direct contact surface between the sleeve and the stranded conductor, which forms a welding plane for welding the sleeve to the stranded conductor. After or during this forming process, the welding may take place by directing welding energy into the welding plane between the stranded conductor and the sleeve. The welding plane is preferably the outer surface of the stranded conductor and the inner surface of the sleeve, which lie against each other after the forming.

The forming may also be done in such a way that after forming, the cross-sectional profile of the sleeve is different on the outside than on the inside. The inner cross-sectional profile of the sleeve is preferably congruent with the stranded conductor or the cable and, for example, round, whereas the outer contour or the outer profile or cross-sectional profile of the sleeve after forming may preferably be angular, in particular polygonal, for example hexagonal or tetragonal. This edge shape is particularly suited for placing the welding tools against the outer circumference of the sleeve.

A seam of the sleeve is preferably located in the area of a flat surface and not in the area of an edge of the polygonal shape of the sleeve. This ensures that the seam is securely welded during welding. In particular, the seam created on the sleeve after wrapping or joining of the sleeve is on that outer surface on which the welding tools engage. Welding energy may be introduced into the welding plane between the sleeve and the stranded conductor and, at the same time, the welding energy may be introduced into the seam. Thus, in a single welding operation, the sleeve may be welded along its seam and simultaneously the sleeve may be welded to the stranded conductor.

It has been recognised that during sonic welding with geometrically matched welding tools, in particular sonotrode and anvil, the sleeve may first be plastically formed around the stranded conductor in a form-fit and then be joined to it in a material-fit. Welding may take place subsequently or during the forming process. Due to the forming and joining with one tool, a high cycle time is possible by a system technology that is simple and robust at the same time. Only a few process parameters have to be set and the process may be carried out economically. The welding may be an ultrasonic welding, a resistance welding or a magnetic pulse welding.

It is also possible to first provide a crimping process to positively join the sleeve to the stranded conductor and to subsequently materially join the sleeve to the stranded conductor using welding process. During this material-locking connecting, an oxide layer on the stranded conductor and/or the sleeve may be broken up.

As already explained, the sleeve may be placed around the stranded conductor. In the subsequent positive joining of the sleeve to the stranded conductor, at least the sleeve, preferably also the stranded conductor, may be plastically deformed and thereby ensure, on the one hand, a good mechanical connection between the stranded conductor and the sleeve along the inner circumference of the sleeve and, at the same time, for example, to plastically shape the sleeve on its outer circumference for a subsequent connecting to a contact sleeve. Here in particular, flat welding surfaces may be formed on the outside of the sleeve, on which the welding tools may particularly well enable both welding of the sleeve to the stranded conductor and subsequent welding of the sleeve to the contact sleeve.

As explained, the sleeve is placed around the stranded conductor. Preferably, the sleeve is then already cut to length or it is cut to length after being placed around. The seam may then be a butt joint or an overlap joint. Welding then takes place in such a way that the welding tools are placed on the seam of the butt joint or the overlap joint, which was preferably plastically deformed beforehand, in order to then weld both the seam and the sleeve with the stranded conductor along this seam. Ultrasonic welding tools as well as resistance welding tools or magnetic pulse welding tools may be used.

According to the subject matter, it is possible to connect an inner side of the sleeve facing the stranded conductor directly to the stranded conductor and to connect a surface of the sleeve facing away from the stranded conductor to a contact sleeve.

The sleeve is preferably formed, with its preferably two different surfaces, in such a way that the risk of contact corrosion in the entire connection is reduced compared to conventional connections.

It is possible to bring the stranded conductor, which is formed from a first metallic material, into contact with a first metallic surface of the sleeve. The sleeve has a second metallic surface formed of a second metallic material different from the first metallic material. This second surface preferably does not come into contact with the stranded conductor.

A contact sleeve may be inserted into the sleeve, in particular into the recess of the sleeve.

A contact between a connecting part, e.g. a connecting cable, and the stranded conductor may be established via the contact sleeve. The contact sleeve as well may be formed from two metallic surfaces. In this case, what is said below for the material of the sleeve may also apply to the contact sleeve. The contact sleeve may be formed as a first section from the material of the stranded conductor and in a second section from the material of the sleeve in the area of the contact surface. The contact sleeve may also be coated accordingly.

The stranded conductor and the connecting part are preferably made of different metal materials. Due to the transition of the metal materials in the area of the sleeve/contact sleeve, there is no direct contact between the different metals of the connecting part and the stranded conductor. The metallic transition between the first metal material and the second metal material at the sleeve/contact sleeve may be sufficiently protected against contact corrosion.

The connecting part may in particular be a stranded conductor or a flat wire made of solid material. The connecting part may also be a connection bolt or a crimp connection or a connection lug.

It is also possible that the respective transition between two metallic materials respectively is formed with such a low standard potential difference that the risk of contact corrosion is reduced. The standard potential difference between the metallic material of the stranded conductor and the metallic material of the first surface of the sleeve/the surface of the first section of the contact sleeve may have a first value. The standard potential difference between the first metal material of the sleeve/the contact sleeve and the second metal material of the sleeve/the contact sleeve may have a second value. The surface of the second section of the contact sleeve may be formed of the same material as the material of the second surface (the contact surface) of the sleeve.

The standard potential difference between the second metal material of the contact sleeve and the metal material of the connecting part may have a third value. The first, second and third values of the standard potential difference may each be smaller than the standard potential difference between the metal material of the stranded conductor and the metal material of the connecting part.

In particular, the first, second and/or third value of the standard potential difference is less than 2V, preferably less than 1V. It is thereby achieved that at no metallic transition, a standard potential difference of more than 2V, preferably 1V, is present, whereby contact corrosion is kept as low as possible.

It may also be useful that the second value of the standard potential difference, i.e. between the first metal material of the sleeve/contact sleeve and the second metal material of the sleeve/contact sleeve, is greater than the first value of the standard potential difference and the third value of the standard potential difference.

In particular, the second value of the standard potential difference may be greater than 1.5 V. At the transitions between the first metal material and the stranded conductor or the second metal material and the metal material of the connecting part, on the other hand, the first and third magnitude of the standard potential difference may be less than 1.5 V. Thereby, the contact corrosion potential is reduced at the immediate contact points between the sleeve/contact sleeve and the stranded conductor or the sleeve/contact sleeve and the connecting part.

The contact corrosion potential is increased in the area of the sleeve/contact sleeve. However, since the sleeve/contact sleeve may be specially secured against contact corrosion, especially against moisture penetration, the overall risk of corrosion of the connection may be reduced.

The standard potential of the various materials is preferably measured at standard conditions, in particular 25° C., 101.3 kPa, ph=0 and an ionic activity of 1 mol/l. Also, a standard hydrogen electrode is preferably used at standard conditions to determine the respective standard potential of a material. The difference of the standard potentials is then determined using the potentials of the respective half cells (material to standard hydrogen electrode).

According to an embodiment example, it is proposed that the value of the standard potential difference between the first metal material and the second metal material is greater than 1V, preferably greater than 1.5V. Also, the value of the standard potential difference between the first metal material and the second metal material may be less than 2.5V. The high standard potential difference at the transition between the first metal material and the second metal material is intentional, since the sleeve/contact sleeve may be protected against the penetration of moisture into the area of the seam or of the transition between the two metallic surfaces.

The sleeve/contact sleeve may be bimetallic, i.e. formed from at least two different metal materials. In this case, a bimetallic metal sheet strip or a bimetallic coating may be formed in the sleeve/contact sleeve. For example, a carrier material or a carrier raw material may be provided and a metallic coating material may be provided. The carrier material or the carrier raw material may be roll cladded with the coating material or the coating material.

According to an embodiment, the sleeve/contact sleeve may be formed from a metallic carrier material and a metallic coating material. The carrier material may form the first metal material and the coating material may form the second metal material. It is also possible for the carrier material to form the second metal material and the coating material to form the first metal material. The stranded conductor may be formed from a metal material, in particular the first metal material or the second metal material.

In particular, it is conceivable to use copper or aluminium materials as the carrier material and to use, for example, nickel as the coating material. It is also conceivable to coat the sleeve/contact sleeve with nickel on all sides. It is also conceivable to use brass as the carrier material. At a transition between the carrier material and the coating material, for example, an additional coating, in particular a metallic coating, for example of nickel, may be provided.

The connection console is particularly suitable for power cables or battery cables, starter cables and/or generator cables, especially in motor vehicles. Such cables have a high current carrying capacity and are suited, for example, to carry several 100 A over a longer period of time. Therefore, conductor cross-sections of greater than 50 mm2 are suggested for the stranded conductors. On the other hand, the conductor cross-section of the stranded conductors is preferably smaller than 200 mm2. These stranded conductors are particularly suitable for use in automotive applications, as they are also claimed according to the subject matter.

In particular, the stranded conductor is an energy line in a motor vehicle, which may be formed, for example, as a battery wire, starter-generator wire, battery-starter wire, generator-battery wire or the like. The stranded conductor may also be installed as an energy backbone in a motor vehicle and, originating from there, a wide variety of outlets to a wide variety of loads may be realised. The connection line may also be formed as a battery line, starter-generator line, battery-starter line, generator-battery line or the like. The connection line may also be installed as an energy backbone in a motor vehicle and, originating from there, a wide variety of outlets to a wide variety of loads may be realised through the stranded cable. In particular, the connection line may be a flat cable. A flat cable is then formed in one piece from a solid material.

According to an embodiment, the stranded conductor is guided in a cable with an insulation. Preferably, the cable is spliced so that the insulation is removed from the stranded conductor in a central region between two insulated outer regions. On both sides of the non-insulated area, the cable may be surrounded by insulation. It is also possible that the stranded conductor is stripped in a region of a front end. The present connection console may be realised in the stripped area.

The sleeve is preferably connected to the stranded conductor by a material bond. In addition, the sleeve is preferably pressed. By pressing, a force fit and/or a form fit may be formed between the conductor and the sleeve. The sleeve may be connected to the conductor in the form of a crimp contact. For this purpose, the stranded conductor is laid into the sleeve in the longitudinal direction.

The conductor is then crimped to the sleeve by a crimping jaw and an anvil. The crimping is preferably done by a crimping tool. The crimping jaw is mounted in the upper part of the crimping tool and the anvil in the lower part. The sleeve is placed on the anvil together with the conductor and the crimping jawjaw performs a plastic deformation of the sleeve in the area of the conductor in such a way that the conductor is held in the sleeve in a form fit and a force fit.

Subsequently, or during crimping, the sleeve may be joined to the conductor with a material bond. In this step, a welding may be executed. The welding may be resistance welding, a magnetic pulse welding or a friction welding, in particular an ultrasonic welding.

By exciting with a high-frequency vibration during crimping, both the mechanical and the electrical properties of the connection may be improved. For example, when using an aluminium stranded conductor, the insulating aluminium oxide layer of the conductor may be broken up by the high-frequency vibration.

The high forces that have to be applied during a conventional crimping process may be drastically reduced if the crimping jaw and/or crimping anvil are excited with a high-frequency vibration during the crimping process. The high-frequency excitation takes place during the crimping process, i.e. simultaneously with it. It is not crimped first and then excited with a high-frequency vibration, but the vibration is applied during the crimping process.

The high-frequency vibration also achieves a change of the relaxation capacity of the conductor and a prevention of creep after the crimping process is complete. The breaking-up of the oxide layer leads to an improved electrical connection and the changed relaxation capacity leads to a long-term stable mechanical connection. The vibration causes a material bond between the strands among themselves and between the strands and the sleeve. This prevents creep.

According to one embodiment, it is proposed that the high-frequency vibration is an ultrasonic vibration and, in particular, that the anvil and/or the crimping jaw is excited with ultrasonic energy during crimping. The crimping jaw and/or anvil is in mechanical contact with an ultrasonic booster so that the crimping jaw and/or anvil may apply the ultrasonic energy to the sleeve along with the conductor. The application of the ultrasonic vibration breaks up the oxide layer on the surface of the conductor and/or on the surface of the sleeve particularly well.

According to one embodiment, it is proposed that the ultrasonic energy is lower than a welding energy required for ultrasonically welding the conductor to the sleeve. In order to weld the sleeve to the conductor, a sufficient energy must be applied to the joint location for both joining partners to melt. However, it is possible that the ultrasonic energy is below the welding energy required for a welding between the conductor and the sleeve. This results in shorter cycle times and lower requirements on the ultrasonic generator, making the joining technique more cost-effective than an ultrasonic welding. A slight superficial material bond between the sleeve and the strands of the conductor may be comprised by this. However, the joining partners do not always have to melt in order to create a material bond. A material bond may already occur if the joining partners become plastic through friction and thus produce a material bond.

According to an embodiment, it is proposed that the conductor is provided as an aluminium stranded conductor or copper stranded conductor. In particular, the use of an aluminium stranded conductor results in particular advantages as a result of to the introduction of the high-frequency vibration. As already mentioned, the relaxation capacity of the stranded aluminium conductor is influenced by the application of the high-frequency vibration in such a way that no or only reduced creep of the stranded conductor occurs after the completed crimping process. The application of the high-frequency vibration also causes the aluminium oxide on the surface of the aluminium stranded conductor to break up. The strands are packed together by the vibration in such a way that air inclusions in the joining area may be nearly avoided. Thus, the joining area is gas-tight and no new oxide layer may form.

In addition, the energy of the high-frequency vibration may be adapted to the cable cross-section of the respective cable. The force with which the crimping jaw is pressed onto the anvil as well as the oscillation energy may be adjusted in a very defined way, so that depending on the cross-section of the respective conductors, a different process parameter (contact force, oscillation energy) may be set in order to obtain a long-term stable, electrically well-conducting, positive-locking connection.

Also when using stranded copper conductors, the contact resistance between the sleeve and the conductor is reduced compared to conventional methods by applying the high-frequency energy. Thus, the present method may be used for various types of stranded conductors.

By introducing the vibration energy by means of high-frequency vibration, it is achieved that the individual strands of the stranded conductor are compacted during the crimping process. Thus, a preferably void-free bundle of strands of the stranded conductor is created in the area of the connection which is crimped. After the crimping process is completed, a largely gas-tight bundle is present in the area of the strands, so that air oxygen may no longer lead to oxidation between the strands in the area of the bundle. The interior of the connection, i.e. in particular the connection between the strands themselves, may thus be protected from corrosion and it is prevented that new, insulating oxide layers form.

The welding energy may be sufficient to weld the strands of the stranded conductor together among themselves. In particular, the circumferential, peripheral strands of the stranded conductor may be welded together with one another. This is particularly the case when the melting point of the material of the stranded conductor is below the melting point of the material of the sleeve. The superficial connection of the stranded conductors to each other ensures a good electrical contact between the strands. It also prevents oxide layers from forming or corrosion from occurring between the strands of the stranded conductor after the crimping process.

The high-frequency vibration is in particular in a frequency range between 20 kHz and 70 kHz. However, the frequency range around 20 kHz, i.e. between 20 and 30 kHz, is preferred.

During the crimping, the sleeve is deformed by the crimping jaw. The required crimping force is applied to the sleeve by the crimping jaw. However, due to the high-frequency vibration being additionally applied during the crimping process, the crimping forces are lower than with conventional crimping methods. Through the crimping jaw and/or the anvil of the crimping tool, a high-frequency vibration is injected into the material of the sleeve and into the strands, which results in it being easier to form than a non-excited material. The high-frequency-accompanied forming during the crimping process has the advantage that the crimping forces to be applied are lower than with conventional crimping processes.

Since vibration energy is already applied to the connection during crimping by the high-frequency vibration, it is possible to use this vibration energy during and/or after the crimping to melt a solder and inject it into the crimp connection between the sleeve and the strands and/or between the strands themselves. While the energy may be too low to weld the conductor to the sleeve, the conductor heats up due to the vibration energy in such a way that during and/or immediately after crimping there is sufficient temperature to melt a solder. The molten solder then flows into gaps that may still exist between the strands as well as between the stranded conductor and the sleeve and thus leads to a further improvement in long-term stability. The vibration creates a kind of suction effect that draws the solder into gaps that may still be present.

In particular, it is proposed to first lower the crimping jaw onto the anvil with a first crimping force and to thereby crimp the conductor to the sleeve. At the same time, the high-frequency vibration is introduced into the connection position. After the crimping is completed, the first crimping force between the crimping jaw and the anvil may be reduced so that a second crimping force is sufficiently large for a high-frequency vibration to be applied into the connection position. The first crimp force and/or the energy of the high frequency vibration may be reduced after the first crimping. In particular, it is proposed that the energy of the high frequency vibration is sufficiently high to heat the contact position above the melting point of the solder and thus melt the solder. The high-frequency excitation achieves that the solder flows particularly well into gaps that may still exist.

Especially when crimping conductors with small cross-sections, the required crimping force as well as the energy of the high-frequency vibration may not be sufficient to heat the connection above the melting point of the solder. Then, during the application of the second crimping force, further vibration energy is applied to the connection until it is heated sufficiently for the applied solder to melt.

A recess is inserted into the sleeve, which in particular runs uninterruptedly through the conductor and through the walls of the sleeve. The recess may be formed by drilling. The recess may also be inserted into the sleeve and the conductor by punching. The recess runs transversely to the longitudinal axis of the sleeve. In particular, the longitudinal axis of the recess runs transversely, especially perpendicular to the longitudinal axis of the sleeve.

A contact sleeve may be inserted into such a recess. This contact sleeve may be connected to at least the strands of the stranded conductor in a material bond, in particular by means of friction welding.

The contact sleeve has a through opening in which a connecting bolt or screw may be arranged. This may then be used to make contact with another connecting conductor.

The recess is preferably a bore. The bore may be cylindrical or frustoconical. The bore is preferably adapted to the contact sleeve inserted into the through-hole.

In order to enable a connection between an electrical conductor and a connecting part, for example a bolt, in particular a screw or the like, it is proposed that a contact sleeve arranged on or in the recess is provided. A secure contact to the conductor is ensured by a material bond connection of the contact sleeve in the area of the recess with the conductor. The contact sleeve offers a sufficiently good contact surface for a connection with an electrical outlet, for example in the form of a bolt. A material bond connection may also be made between the contact sleeve and the sleeve in the area of a contact surface of the sleeve.

However, installing the contact sleeve at the recess is technically challenging. During welding, the contact sleeve must both be pressed against the sleeve with a sufficiently high contact pressure and at the same time be set in rotation. A friction welding tool, needs to, while rotating and setting the contact sleeve in rotation, also press the contact sleeve against the conductor and/or against the sleeve at the same time.

It has been found that the electrical contacting of an electrical outlet on the contact sleeve is sufficiently good even if the bolt required for this does not lie directly against the inner circumference of the sleeve. It is sufficient if a bolt head rests against the end face of the sleeve. Then, a sufficiently good electrical contact is possible. On the other hand, this leads to neither a form fit between the through opening in the contact sleeve or the inner circumferential surface of the through opening in the contact sleeve and the outer shape of the bolt being necessary, nor do the cross sections have to be complementary to each other. Rather, it has been recognised that it is advantageous for the manufacturing process if a through opening is provided in the contact sleeve which is formed as an inner polygon. The inner circumference of the through opening is formed as a polygon. On the other hand, the outer circumference of the contact sleeve is preferably substantially round, so that the contact sleeve may be rotated in the recess. This allows the contact sleeve to be welded to the strands by means of a rotary movement.

The inner circumference of the recess in the sleeve and in the conductor is substantially congruent with the outer circumference of the contact sleeve. On the other hand, the inner circumference of the through hole in the contact sleeve may be polygonal and neither congruent to its outer circumference nor congruent to a bolt insertable into the through hole of the contact sleeve. However, it is also possible that the inner circumference of the through-opening in the contact sleeve is round and/or congruent with its outer circumference and/or with a bolt that may be inserted into the through-opening of the contact sleeve.

A particularly good fastening of the contact sleeve to the recess is possible if the contact sleeve has a collar pointing radially outwards. This collar may be formed as a flange. This collar may preferably be formed by the contact sleeve being formed from at least two sections. The two sections extend side by side in the axial direction of the through-opening of the contact sleeve. A first section has a first outer circumference and a second section has a second, larger outer circumference than the first outer circumference. The second section may thus project radially outwards from the first section. When attaching the contact sleeve to the recess, the contact sleeve is preferably inserted into the recess with the first section. The second section means that the insertion depth of the contact sleeve in the recess is limited, as the second section forms a stop.

After the contact sleeve has been inserted into the recess, the friction welding process may begin. During the friction welding process, the contact sleeve is preferably welded by means of friction welding in the area of the contact surface between the sleeve and the second section. By a contact pressure onto the contact sleeve, the second section is pressed against the surface of the sleeve. It has been recognised that it is in this area the greatest welding energy occurs and in particular this area will be welded first by friction welding.

It is also possible that the contact sleeve is inserted into the recess and welded to the sleeve and/or the conductor by means of resistance welding. It is also possible that the contact sleeve is inserted into the recess and welded to the sleeve by means of magnetic pulse welding.

The second section is preferably formed as a flange and serves on the one hand as a contact surface on the sleeve and on the other hand as an enlarged contact surface for a connecting part. A head of a connecting bolt or a nut screwed to the connecting bolt or a washer may rest on the surface of the flange facing away from the sleeve.

It has been found that it is particularly advantageous if the first and second portions are formed as a one-piece part. In particular, the contact sleeve may be formed as a stamped or turned part. By the one-piece nature it is prevented that the contact sleeve is damaged during the welding process, in particular that a connection between the first and second sections is released. On the other hand, it is achieved that the contact sleeve permanently withstands dynamic environmental conditions.

The recess may have a shape complementary to the outer surface of the first section of the contact sleeve. The contact sleeve may then adhere to the inner wall of the recess. Preferably, there is a positive fit between the recess and the first portion. In this case, welding also results in the application of sufficient welding energy in the area of the connection between the outer circumference of the first section and the strands at the recess. Then, the contact sleeve and the strands are also welded in this area.

As already mentioned, a contact pressure is applied to the contact sleeve during friction welding. This contact pressure is preferably applied from the direction of the second section, so that this is in contact with the sleeve. Due to the contact of the second section with the surface of the sleeve, sufficient welding energy is also applied to this area during friction welding. It has been found that it may be sufficient to weld the second section to the sleeve at the contact surface. In particular, a weld seam is made possible in the area of the collar of the second section.

The contact sleeve has a through opening which may be formed as an inner polygon. In particular, the through opening is complementary in shape to a friction welding tool, in particular a friction welding mandrel. The friction welding tool may be inserted into the through-opening and preferably rests against the through-opening in a clearance fit. For welding, a torque is applied to the contact sleeve via the friction welding tool. The fact that the through opening is formed as an inner polygon means that the torque of the friction welding tool is received particularly well.

In this context, it should be mentioned that the term internal polygon may also be understood to mean a multi-round shape. In particular, the through opening is formed as a drive profile, with sections with a smaller radius and sections with larger radius, whereby the sections succeed each other alternately.

A particularly good fit of the contact sleeve at the recess is achieved by the outer circumference of the first section tapering from the second section in the axial direction of the recess. The first section then is preferably frustoconical.

The extension of the first section in the axial direction preferably corresponds to the material thickness of the electrical conductor together with the sleeve in the direction of its recess. It is then ensured that the first section preferably lies flush with the recess of the sleeve.

As mentioned before, the problem of a contacting between the sleeve and the connecting lead preferably arises in the case where the sleeve is made of aluminium. The use of an aluminium material as material for the sleeve has great advantages in terms of material costs and weight, so that it is preferred that the sleeve is formed from an aluminium material or an alloy thereof. The contact sleeve may be formed from a transition metal material or an alloy thereof. The use of a stainless steel, copper or brass sleeve is preferred. The use of a contact sleeve made of a material other than aluminium has two advantages. Firstly, the electrical contacting between the connecting bolt and the sleeve is prevented from deteriorating due to aluminium oxide. Secondly, if a harder material than aluminium is used, the mechanical strength of the connection between the contact sleeve and the connecting bolt may be increased. When using stainless steel, copper or brass, it may be ensured that the mechanical stress does not cause any significant deformation of the contact sleeve when the connecting part is screwed through the contact sleeve. It is also ensured that the end faces of the contact sleeve do not deform significantly when subjected to continuous mechanical stress, so that a permanently firm connection between the connecting bolt and the contact sleeve is guaranteed.

According to an embodiment example, it is proposed that the clear diameter of the through opening in the contact sleeve is suitable for receiving a bolt, in particular a threaded bolt. Here, threaded bolts with an M6 or an M8 thread are of particular interest. The clear width between the areas with the smaller radius is at least large enough to allow a suitable bolt, in particular an M6 or an M8 bolt, to be inserted. It has been found that clear widths of 6 or 9 mm are then advantageous.

The connection console is preferably located between the ends of the cable and is preferably located in a central area of the cable. In particular, the connection console is located distanced from the distal ends of the cable. By preferably arranging the sleeve on the stranded conductor in a material bond, the latter may be compacted. The strands may be fixed by the sleeve. Furthermore, the strands may be protected from environmental influences by the sleeve.

In particular, the stranded conductor of the electric cable is insulated and in the area of the connection console, the stranded conductor (conductor) is free of the insulation. Thus, the connection console lies between two insulated areas of the conductor. In this stripped area, according to an embodiment, the sleeve may be connected to the conductor in a material bond. If several stripped areas are provided, one or more connection consoles may be provided along the cable, via which electrical taps are possible. In particular if the cable is one of the main battery strings, a variety of electrical taps may thus be made possible on the battery string without negatively affecting the conductance of the battery line as such due to otherwise necessary interruptions. The taps do not lead to increased electrical power loss along the cable, as the cable is not interrupted by the taps.

A tap may be connected to the cable conductor via the contact sleeve. In this case, the cable remains intact and its conductance is essentially unaffected. In this way it is possible to run a one-piece or two-piece or multi-piece cable from the battery to the engine compartment, in particular to the starter or the electric motor in the engine compartment, which is not or only marginally influenced by taps in its electrical conductivity of a respective section. The insulation of the cable is such that it completely surrounds the conductor in the insulation sections. The insulation is preferably formed from a non-conductor, in particular a plastic, such as PVC or silicone.

According to an embodiment, it is proposed that the electrical conductor is a round conductor. Preferably, the electrical conductor is bend-resistant and is thus in particular due to its own weight not plastically deformable. It is also proposed that the strands are formed from aluminium or an alloy thereof. In particular E-aluminium, for example aluminium 99.5 may be used for the conductor.

Depending on the use of the material of the conductor, preferably the sleeve is formed of an electrically similar, in particular the same metallic material. For example, if the conductor is formed from copper or an alloy thereof, the sleeve may also be formed from copper. However, since the present connection console is advantageous in particular when aluminium is used, it is also proposed according to an embodiment that the sleeve is formed from aluminium or alloys thereof. The use of an electrically similar or identical metal for the conductor as well as the sleeve achieves a homogeneous connection in the area of the connection console between the tap and the conductor. Contact corrosion is thus prevented or reduced to a minimum. What has been said here for the sleeve applies equally to the described contact sleeve.

On the other hand, the connection console is intended to provide an electrical tap. This tap is used by cables departing from the tap. These may be made of copper, for example. To facilitate the electrical tap at the connection console, it is proposed that the contact sleeve and/or the connecting part may be formed of copper or alloys thereof. However, it is also possible to have an outlet to an electrical contact part made of aluminium, so that the contact sleeve and/or the connecting part may then also be formed of aluminium.

The contact corrosion between the contact sleeve made of aluminium and the connecting part may be reduced by the connecting part being formed of steel or stainless steel. In this case, the contact corrosion between the connecting part and the contact sleeve is negligible. Suitable insulation measures may protect the contact point between the connecting part and the contact sleeve from environmental influences, in particular from water, and thus reduce the risk of corrosion.

In order to equip the connecting part for connection to a cable lug or other cable end, it is proposed that it is tin-plated and/or sub-nickel-plated.

According to an embodiment, it is proposed that the sleeve, the contact sleeve, in parts the optional connecting part and the conductor are sheathed with an insulation. In particular, the insulation is such that it not only surrounds the sleeve, the contact sleeve, parts of the optional connecting part and the conductor, but extends beyond the insulation of the conductor. Thus, a complete enclosure of the sleeve, the contact sleeve, the part of the connecting part and the conductor is made possible. The ingress of moisture is largely prevented by the insulation. This protects the transitions between the conductor and the sleeve, or between the contact sleeve and the connecting part, from ambient moisture.

To enable an electrical connection to the terminal stud, the terminal bolt is free of insulation at its end remote from the contact sleeve. It is possible that the insulation in the area of the bolt is such that it is formed to receive a closure, in particular in the form of a cap. Thus, the end of the bolt may be covered with an insulation cap and, in the event that a connection to the bolt is to be made, the cap may be removed.

In order to avoid incorrect polarity during the installation of the board net and, in particular, to contact the correct bolts for the respective outlets, it is proposed that the insulation is mechanically coded in a Poka Yoke fashion in the area of the end of the connecting bolt distal from the contact sleeve. By a certain shape of the circumference of the insulation of the bolt in the area of the end distal from the sleeve, it may be ensured that only certain types of connection plugs may be connected to the bolt. For example, unless the inner circumference of a plug is congruent with the outer circumference of the insulation on the bolt, a plug connection may be prevented. This may prevent incorrect connections. In particular, the coding is done by shaping the outer circumference of the insulation in the area of the end of the bolt.

In order to be able to fix the connection console, for example, in a receptacle inside the vehicle body, it is proposed that an edge length of the pressed sleeve is larger than the diameter of the conductor, in particular larger than the diameter of the cable. In particular, square as well as rectangular shapes of the pressed sleeve have proven to be advantageous.

BRIEF DESCRIPTION OF THE DRAWINGS

In the following, the subject matter will be explained in more detail with reference to a drawings showing exemplary embodiments. The drawings show.

DETAILED DESCRIPTION OF SPECIFIC EMBODIMENTS

Figure 1A:
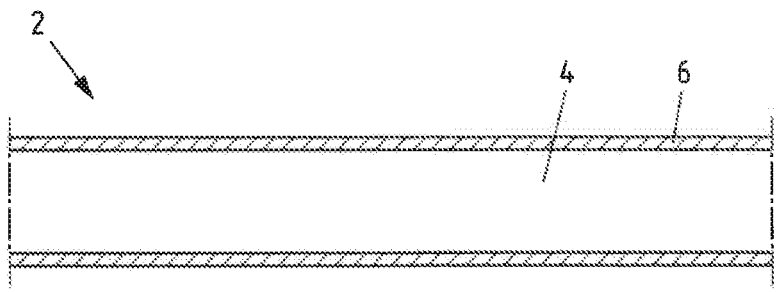
FIG. 1a a cross-section of a cable.

FIG. 1a shows an electrical cable 2 with a metallic conductor 4 and an insulation 6.

The metallic conductor 4 is preferably a stranded conductor and is in particular bend-resistant. The conductor 4 is preferably a round conductor. The material of the conductor 4 is preferably aluminium, in particular aluminium 99.5. The bending resistance of the cable 2 results when the cable 2 cannot be plastically deformed due to its own weight force. A force greater than the weight force is necessary to cause plastic deformation of the cable 2.

The insulation 6 is preferably made of PVC or silicone.

Figure 1B:
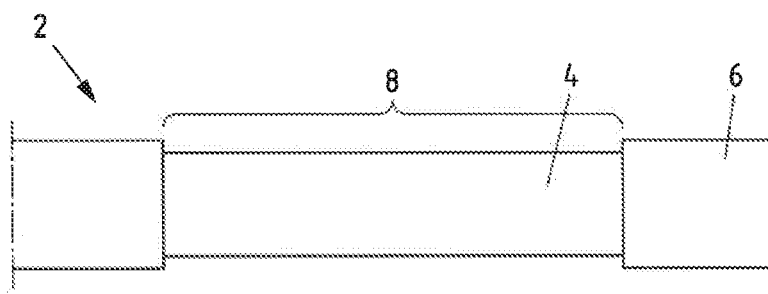
FIG. 1b a view of a stripped cable.

As shown in FIG. 1b, in a present connection console, the cable 2 may be stripped in a central area, i.e. away from its respective distal ends, so that a stripped area 8 is formed. In the stripped area 8, the conductor 4 is free from the insulation 6.

Figure 1C:
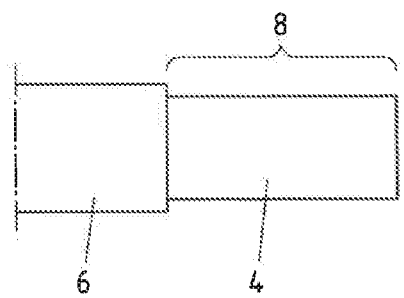
FIG. 1c a view of another stripped cable.

As shown in FIG. 1c, in a connection console according to the subject matter, the cable 2 may be stripped in an end region, that is at a front end, so that a stripped area 8 is formed. In the stripped are 8, the conductor 4 is free of the insulation 6.

A joint between the sleeve 10 and the stranded conductor 4 of the cable 2 is shown by way of example in FIG. 2.

A metal sheet as described in FIGS. 3a-f may, depending on the application and the material of the stranded conductor 4, either be placed on the stranded conductor 2 with the surface 40a or the surface 40 or be placed on the stranded conductor 4 with the carrier material 10c or the coating material 10d.

Here, it is possible that the cable 2 is spliced so that the stranded conductor 4 is exposed between two insulated regions of the cable 2. The sleeve 10 is placed around such an area. Here, the sleeve 10 is placed with one of the surfaces 10a, b on the stranded conductor 4 and then folded over. The sleeve 10 may be cut to length before being folded over, or it may be cut to length after being folded over.

Figure 2A:
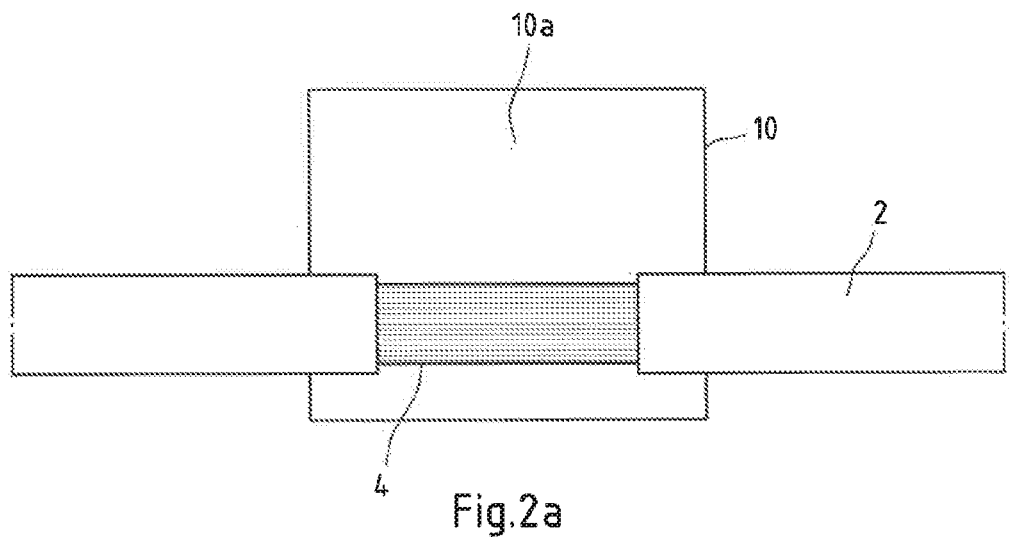
FIG. 2a a cable with a sleeve not yet applied.
Figure 2B:
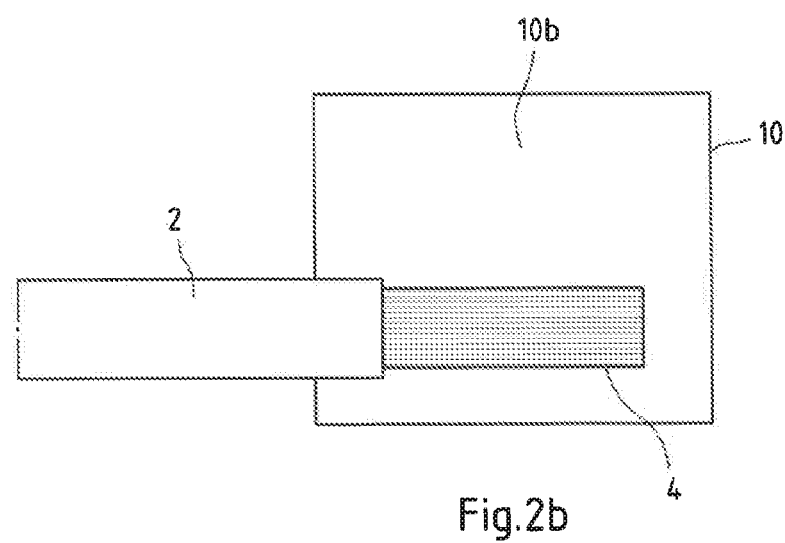
FIG. 2b a cable with a sleeve not yet applied.

FIG. 2b shows an embodiment in which the sleeve is placed around the stranded conductor 4 at a stripped end of the cable 2. Here, too, it depends on which material the stranded conductor 4 is made of which of the surfaces 10a, b of the sleeve 10 is placed on the stranded conductor 4. Copper materials or aluminium materials are particularly suitable for the stranded conductor 4.

Figure 2C:
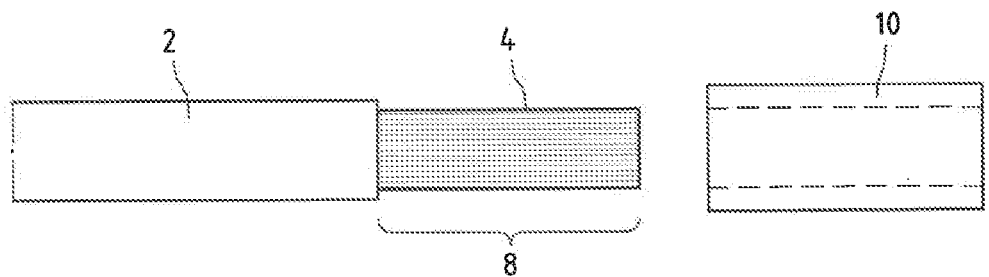
FIG. 2c a cable with a sleeve not yet applied.
Figure 3A:
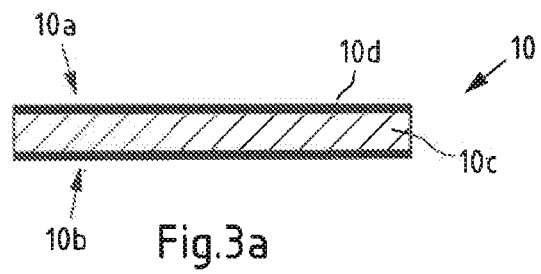
FIG. 3a-f sleeves according to embodiments.
Figure 3B:
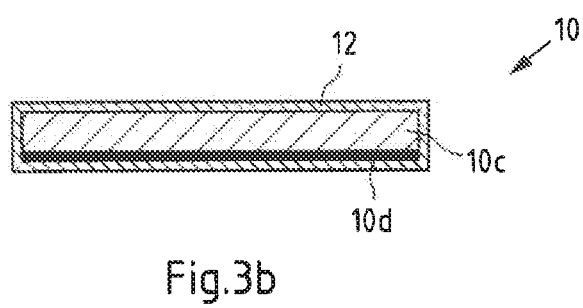
Figure 3C:
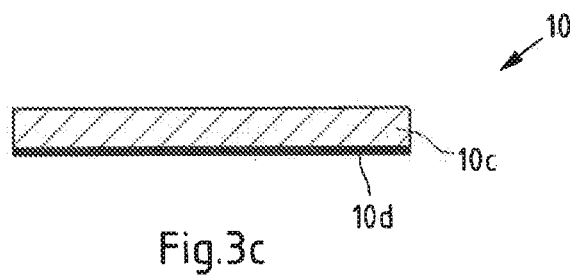
Figure 3D:
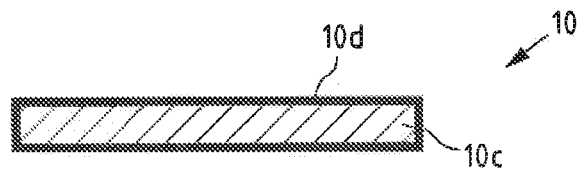
Figure 3E:
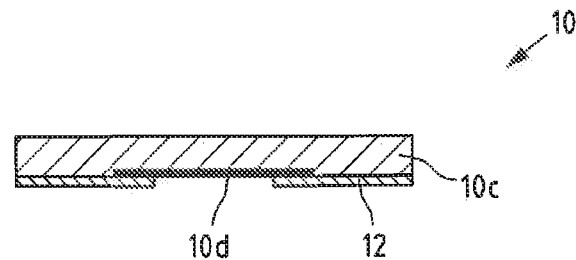
Figure 3F:
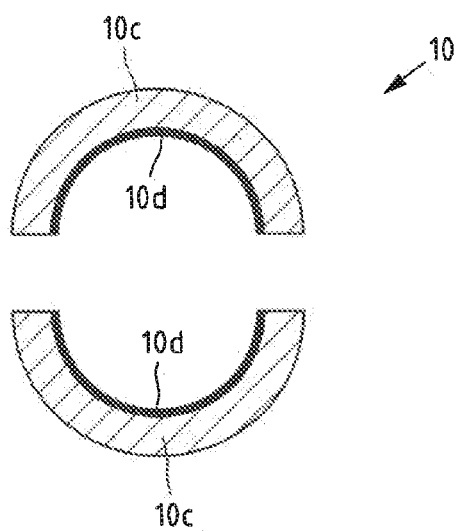

FIG. 2c shows the sliding or placing of a sleeve 10, for example according to FIG. 3f, onto a front end of a cable 2 on which the stranded conductor 4 is stripped.

Figure 2D:
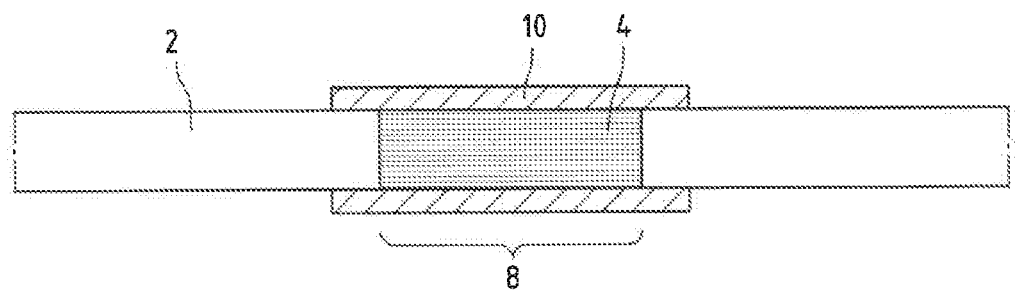
FIG. 2d a cable with a sleeve applied.

According to FIG. 2d, the cable 2 is spliced so that the stranded conductor 4 is exposed between two insulated areas of the cable 2. The sleeve 10 is now pushed onto such an area or, in the case of a multi-part sleeve, placed on top. In this case, the sleeve 10 is placed with one of the surfaces 10a, b on the stranded conductor 4 and then pressed.

Figure 4A:
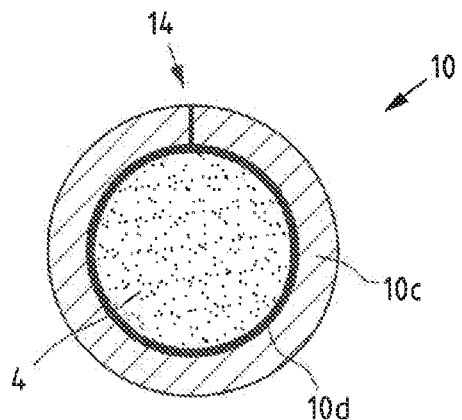
FIG. 4a,b a connection between a sleeve and a stranded conductor according to embodiments.

After the sleeve 10 has been placed on the stranded conductor 4, it is plastically deformed and laid around the stranded conductor. A cross-section of such an at least mechanically joined connection between the sleeve 10 and the stranded conductor 4 is shown in FIG. 4a.

FIG. 3a-f show the sleeve 10 in the not yet formed state, and in particular a transverse or longitudinal section through the sleeve 10.

FIG. 3a shows a sleeve 10 in a cross-section. The sleeve 10 has two surfaces 10a and 10b which are formed from different metal materials. The sleeve 10 according to FIG. 3a is for example a bimetallic sheet metal strip, with a carrier material 10c and a coating material 10d. The junction between the carrier material 10c and the coating material 10d is characterised by a standard potential difference. This is preferably greater than one Volt.

The substrate material 10c may be, for example, an aluminium material or a copper material. All alloys of aluminium and copper may be used as a carrier material. The coating material 10d may also be a copper material or an aluminium material as well as all alloys belonging thereto. Also, the coating material 10d may also be nickel.

FIG. 3b shows a further example of a sleeve 10 in which the carrier material 10c and the coating material 10d are coated on all sides with a further material 12. The material 12 may in particular be a nickel material.

FIG. 3c shows a further embodiment of a sleeve 10. Here, the carrier material 10c may be formed as a sheet and the coating material 10d may be, for example, a coating, in particular with nickel. The coating may be an electroplated coating.

FIG. 3d shows a further embodiment of a sleeve 10. Here, a carrier material 10c may be coated on all sides with a coating material 10d. Preferably, the coating material 10d may be a nickel layer.

FIG. 3e shows a further embodiment of a sleeve 10. Here, a carrier material 10c may be provided with a coating material 10d arranged thereon or embedded, in particular roll-cladded, therein. A transition between the carrier material 10c and the coating material 10d may be coated, for example, by a coating 12 which is nickel, for example. The coating material 10d may be free of the coating 1 remote from the transition between the carrier material 10c and the coating material 10d.

FIG. 3f shows a further embodiment of a sleeve 10, which is formed as a two-part sleeve 10 in which carrier material 10c and coating material 10d are provided on both sleeve parts. It is not shown that the sleeve may also be fully coated, e.g. with nickel.

The explanations regarding the material combinations for carrier material 10c and coating material 10d apply to all conceivable sleeves 10. In particular, further material combinations are possible, especially using stainless steel or the like.

FIG. 4a shows a cross-section of a connection between a sleeve 10 and a stranded conductor 4. Here, the coating material 10d is on the side of the sleeve 10 facing the stranded conductor 4 and the carrier material 10c is on the side of the sleeve 10 facing away from the stranded conductor 10. By plastic deformation of the sleeve 10, initially a form-fit connection at the junction between the coating material 10d and the stranded conductor 4 is produced. The sleeve 10 is placed in a butt joint around the stranded conductor 4 and a seam 14 is formed.

Figure 4B:
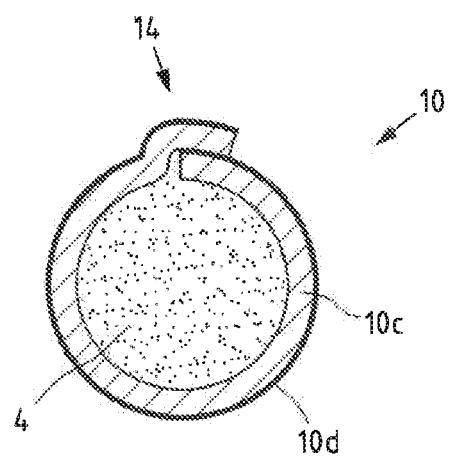

FIG. 4b shows a further embodiment in which, for example, the carrier material 10c is arranged on the side of the sleeve 10 facing the stranded conductor 4 and the coating material 10d is arranged on the side of the sleeve 10 facing away from the stranded conductor 10.

The sleeve 10 has been placed around the stranded conductor 4, for example, and then cut to length. The seam 14 is formed, for example, as an overlap joint.

After the sleeve has been placed against the stranded conductor 4, the latter is plastically deformed.

Figure 5A:
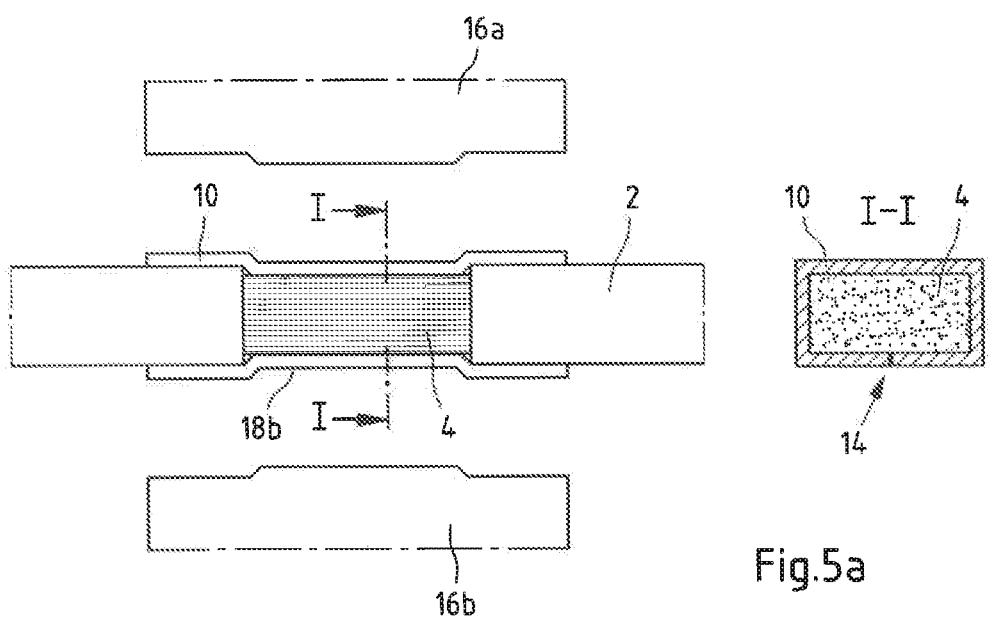
FIG. 5a-c a connection between a sleeve and a stranded conductor according to embodiments.

FIG. 5a shows the pressing of the sleeve 10 at the stranded conductor 4. FIG. 5a shows, by way of example, two pressing jaws 16a, 16b with which the sleeve 10 may be formed onto the conductor 4 in a plastically forming fashion. For this purpose, the pressing jaws 16a, b move in the direction of the sleeve 10 and deform it in the process. The cross-section I-I is shown on the right in FIG. 5a. As may be seen, the pressing jaws 16a, b are used to define a contour of the sleeve 10, for example. In the example shown, after being pressed by the pressing jaws 16a, b, the sleeve 10 has a rectangular outer contour with two opposing surfaces 18a, b. The surfaces 18a,b preferably run parallel to each other. Furthermore, the sleeve 10 lies directly against the stranded conductor 4.

Furthermore, it may be seen in FIG. 5a that the sleeve 10 is optionally also pressed against the cable 1 in the area of the insulation of the cable 2. The pressing jaws 16a, b may be shaped in such a way that a form-fitting and preferably also gas-tight connection is formed between the sleeve 10 and the insulation of the cable 2.

In FIG. 5a the seam 14 of the sleeve 10 may also be seen. The seam 14 is located in the region of a flat surface 18a,b of the outer circumference of the sleeve 10. In particular, the seam 14 is in the region of a welding plane with which the sleeve 10 is welded to the stranded conductor 4. The pressing jaws 16a, b may also be formed as ultrasonic tools, in particular as an anvil and sonotrode, and may enable welding of the sleeve 10 to the stranded conductor 4 as well as along the seam 14 directly during the pressing described according to FIG. Sa.

The pressing jaws 16a, b may function as a sonotrode and an anvil. The contour of the sonotrode 16a and anvil 16b may be such that the cross-section along the cutting plane I-I of the sleeve 10 is angular after deformation. With the aid of the sonotrode 18a and the anvil 18b, it is possible to first place the sleeve 10 around the stranded conductor 4 in a shaping manner and then weld it to the stranded conductor 4 afterwards or in the same work step. In this case, welding may take place simultaneously along the seam 14.

Figure 5B:
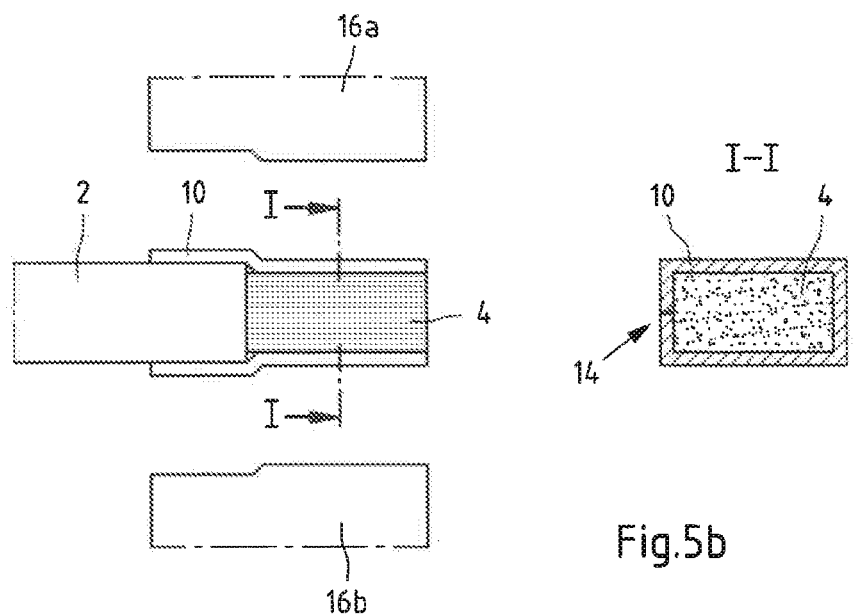
Figure 5C:
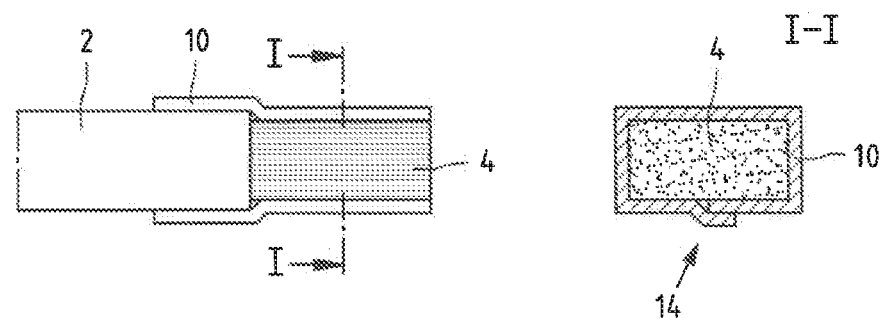

FIG. 5b shows a further embodiment. Here, pressing jaws 16a, b or sonotrode 16a and anvil 16b may be provided to press the sleeve 10 onto the stranded conductor 4 and, if necessary, to weld it simultaneously or subsequently. The pressing jaws 16a, b are used to shape the cross-section along section I-I as shown in FIG. Sb. Here as well, flat welding surfaces are formed. The seam 14 may be provided within one of these welding surfaces.

FIG. Sc shows another embodiment in which the sleeve 10 is pressed against the stranded conductor 4 and the insulation of the cable 4. Section I-I shows that the outer circumference may be, for example, tetragonal and, in particular, the seam 14 may also be formed as an overlap joint.

Figure 6:
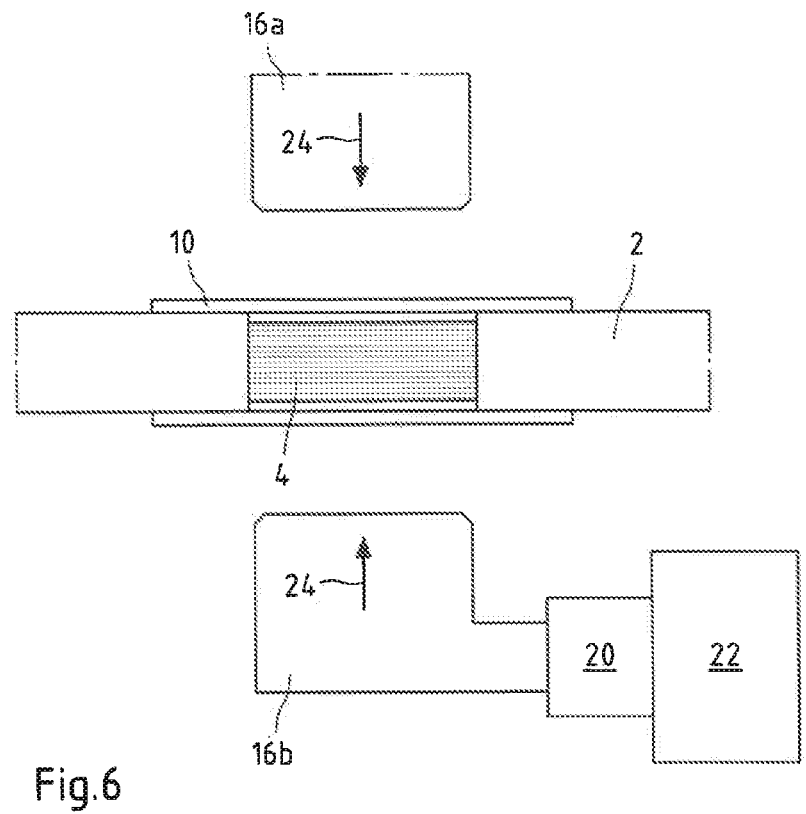
FIG. 6 joining a sleeve to a stranded conductor.

The pressing jaws 16a, 16b may be formed as a crimping jaw 16a and a crimping jaw 16b, as shown in FIG. 6a. The crimping jaw 16b is coupled to an ultrasonic converter 22 via a booster 20.

For crimping, the sleeve 10 with the conductor 4 is first placed on the crimping jaw 16b.

Then the crimping jaw 16a is pressed against the crimping jaw 16b with a force so that the sleeve 10 is pressed.

At the same time, the converter 20 is activated and the crimp die 16b is excited via the booster 10 with a high-frequency vibration, in particular an ultrasonic vibration. The direction of vibration is in particular perpendicular to the direction of movement 24. The direction of vibration may also be essentially parallel to the longitudinal direction of the line 2.

During the lowering of the jaw 16a onto the jaw 16b, both the sleeve 10 and the conductor 4 are excited with the high-frequency vibration. This leads to an easier deformation of the sleeve 10 and the conductor 4. The high frequency vibration causes a welding between the strands of the conductor 4 among themselves in the stripped area 8. The energy applied may be less than necessary to cause welding between the metal of the strands 4 on and the metal of the sleeve 10.

After crimping, the crimping jaws 16a, 12 are lifted from the sleeve in the opposite direction 24. The crimp connection formed is superior over previous ones because the conductivity of the contact is improved. The reason for this is the high-frequency vibration applied during the crimping process. In particular, this high-frequency vibration breaks up an insulation layer on the strands of the conductor 4. Furthermore, a welding between the strands is produced in the stripped area 8 of the conductor 4. A preferably void-free bundle of strands is created.

While the crimping jaw 16a is moved onto the sleeve 10, in particular after the crimping jaw 16a has plastically deformed the sleeve 10, a solder may be brought to the area of the sleeve 10. Due to the vibrational energy applied by the jaw 16a, the conductor 4 as well as the sleeve 10 have heated up such that the solder melts.

It is also possible, especially with small cross sections that after the joining process the crimping jaw 16a is first lifted a little from the sleeve 10 so that the contact pressure is reduced compared to the crimping process. Furthermore, the vibration energy may be reduced, but still be applied to the contact position between conductor 2 and sleeve 10. This allows the conductor 4 as well as the sleeve 10 to be heated so far that the solder melts and penetrates into the crimp connection.

The high-frequency vibration creates a capillary effect for the solder and it flows very well into cavities that may still exist.

After joining the sleeve 10 to the stranded conductor 4 in a form fit as well as a material bond, in particular by means of ultrasonic welding or resistance welding, and possibly to the insulation of the cable 2, it is possible to insert a contact sleeve into the sleeve 10.

Figure 7:
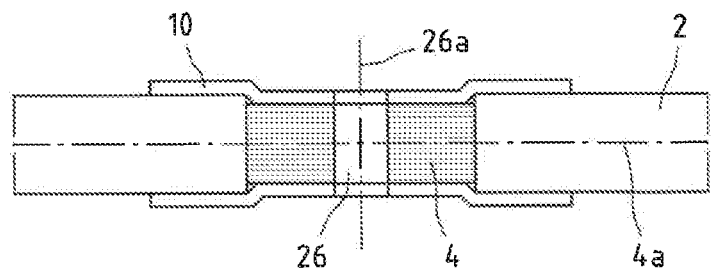
FIG. 7 a sleeve with a recess.

For this purpose, a recess 26, as exemplarily shown in FIG. 7, is produced in the sleeve 10 and the stranded conductor 4. The stranded conductor 4 has a longitudinal axis 4a, and the sleeve 10 extends parallel to this longitudinal axis 4a. The axis 26a of the recess 26 runs transversely to this longitudinal axis 4a.

The recess 26 may be produced in the sleeve 10 and the cable 4 by punching or drilling. A contact sleeve may then be inserted into the recess, as will be shown in the following.

Figure 8A:
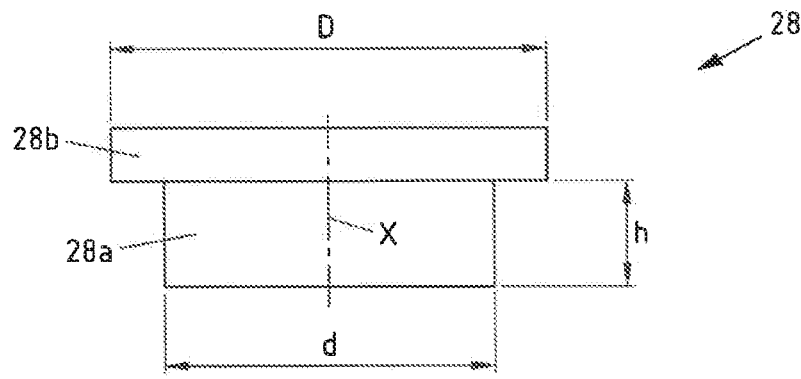
FIG. 8a-c contact sleeves according to embodiments.

FIG. 8a shows a contact sleeve 28. The contact sleeve 28 is formed from two sections 28a, 28b. The sections 28a, b are arranged side by side in the direction of the longitudinal axis X of the contact sleeve 28.

The two sections 28a, b may also be one piece and formed from the solid material of the contact sleeve 28.

It may be seen that the section 28a has a smaller diameter d than the section 28b, which has the diameter D. The larger diameter D means that the section 28b is arranged at the section 28a in a flange-like fashion.

The section 28a preferably has a height h which corresponds to the length of the recess 26 in the direction 26.

Figure 8B:
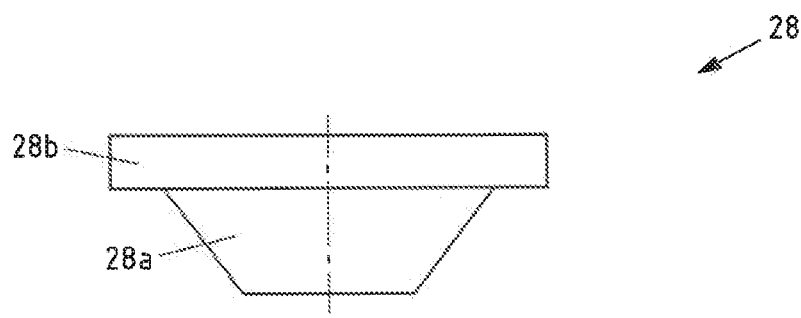

FIG. 8b shows a further contact sleeve 28 in which the first section 28a tapers along the axis X starting from the second section 28b. In particular, the first section 28a is frustoconical.

Figure 8C:
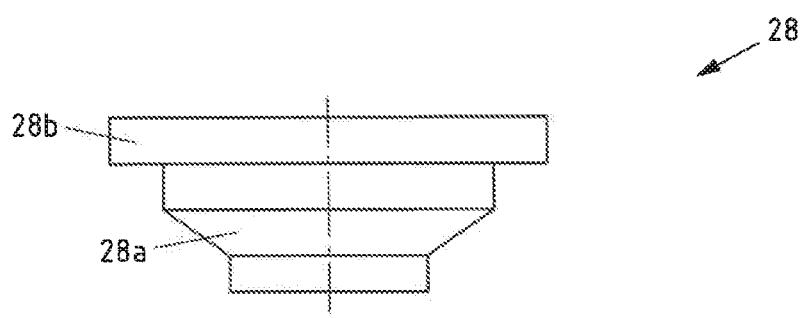

FIG. 8c shows another contact sleeve 28 in which the second portion 28a is formed in sections from a cylindrical region, a frustoconical central region and a cylindrical end region.

The shape of each of the first sections 28a is preferably such that their profiles correspond to the recess 26.

For process-safe welding of the contact sleeve 28 in the recess 26, it is proposed that a through opening 30 is formed in the contact sleeve 28 with different diameters. Such different diameters result in different profiles of the through opening 30 as shown in FIGS. 9a-d.

FIG. 9a-d show top views of contact sleeves 2 on the respective first section 28a.

Figure 9A:
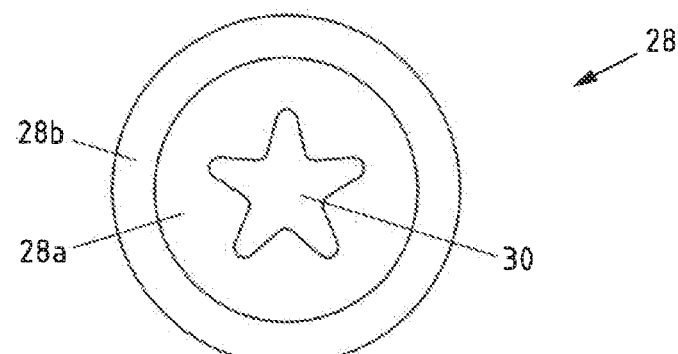
FIG. 9a-d contact sleeves according to embodiments.

FIG. 9a shows a contact sleeve 28 with a through-opening 30, which is formed as a polygonal shape.

The through opening 30 passes through the first section 28a and the second section 28b. Furthermore, it may be seen in FIG. 9, as well as in FIGS. 9b-d, that the second section 28b is arranged in a flange-like fashion on the first section 28a and forms a bearing surface facing in the direction of the first section 28a. With this contact surface, the contact sleeve 28 may be placed against the sleeve 10 in the area of the recess 26.

Figure 9B:
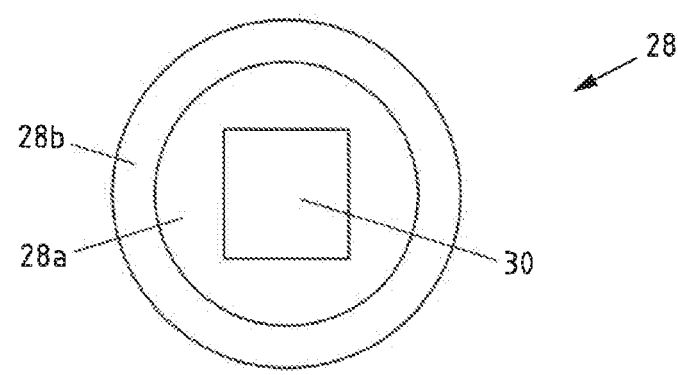

FIG. 9b shows an embodiment in which the through opening 30 is tetragonal.

Figure 9C:
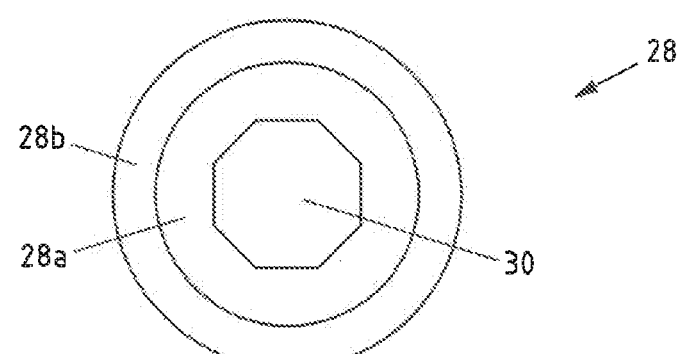

FIG. 9c shows an embodiment in which the through-opening 30 is octagonal.

Figure 9D:
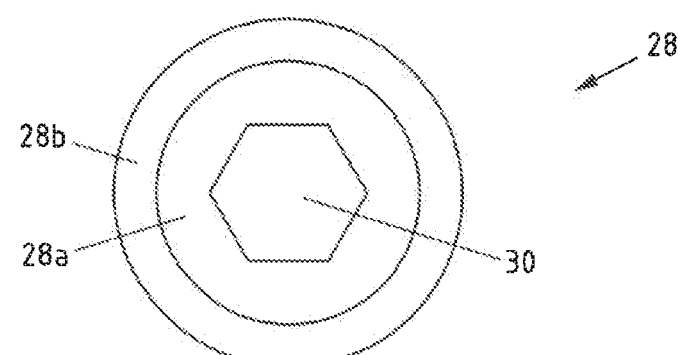

FIG. 9d shows an embodiment in which the through-opening 30 is hexagonal.

The through openings 30 are such that they each have a clear diameter that is smaller than the largest possible diameter. The offset of the diameters results in a particularly good torque transmission from a friction welding tool to the contact sleeve 28.

Figure 10:
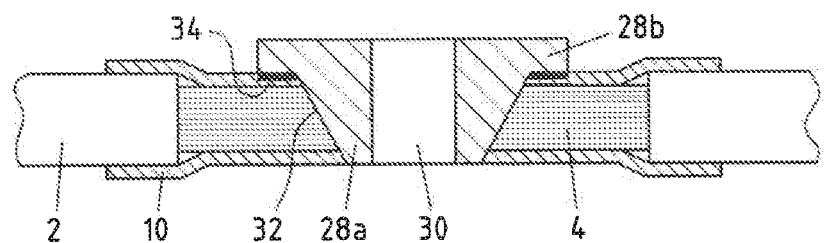
FIG. 10 a connection between a contact sleeve and a sleeve with conductor.

A welded contact sleeve 28 at the sleeve 10 is shown in FIG. 10. It may be seen that the contact sleeve 28 is inserted into the recess 26. It is further shown that a weld seam 34 is formed at least in the area of the contact surface between the second portion 28 b and the surface of the sleeve 10. However, the weld seam 34 may also extend into the region of the contact surface 32 between the lateral surfaces of the first section 28a and the recess 26. In this case, a material bond may be formed between the material of the contact sleeve 28 in the section 28a with the strands of the stranded conductor 4.

Figure 11A:
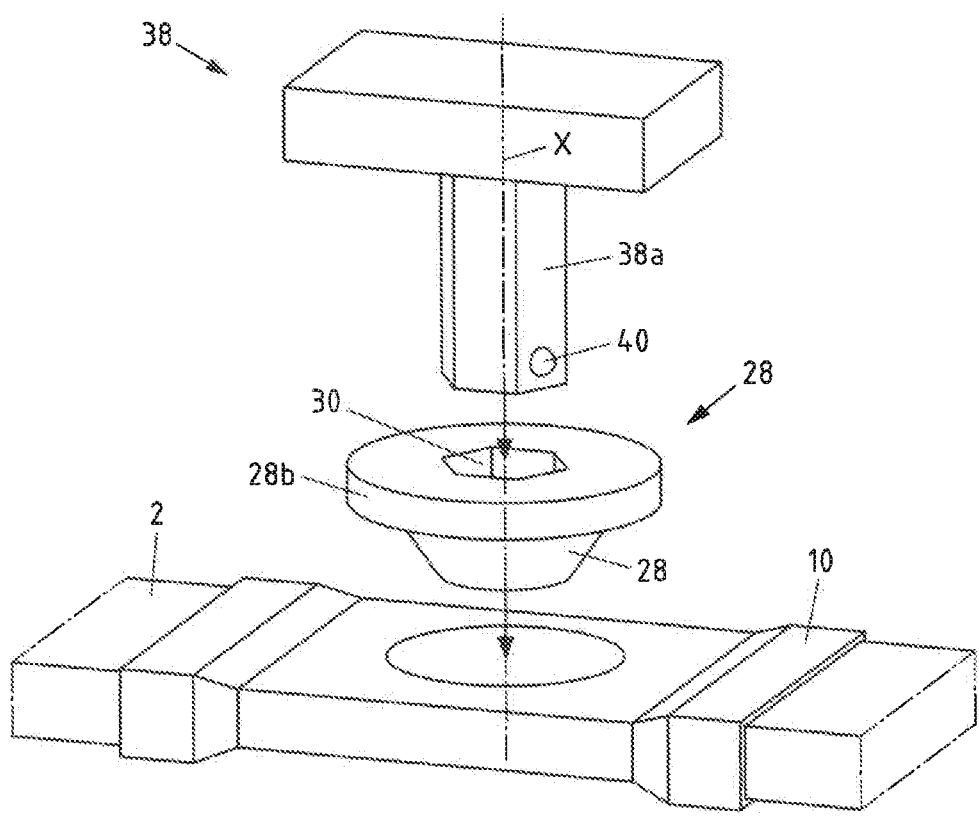
FIG. 11a-b joining of a contract sleeve in a recess of a sleeve.

To join the contact sleeve 28 into the recess 26, the contact sleeve 28 is first pushed with its through opening 30 onto a friction welding mandrel 38a. FIG. 11 shows how the friction welding mandrel 38a is pushed into the through-opening 30 along the X-axis. Optional holding means 40 exert a holding force on the contact sleeve 28 so that it cannot slip off the friction welding mandrel 38 by its own gravity force.

Subsequently, the friction welding mandrel 38a or the friction welding tool 38 is moved with a translatory movement in the direction of the recess 26. In the process, the contact sleeve 28 is inserted into the recess 26.

Because of the flange formed by the second section 28b, the contact sleeve 28 comes to an end position at a certain insertion depth in the recess 26. In this end position, the flange of the section 28b rests against the surface of the sleeve 10.

Figure 11B:
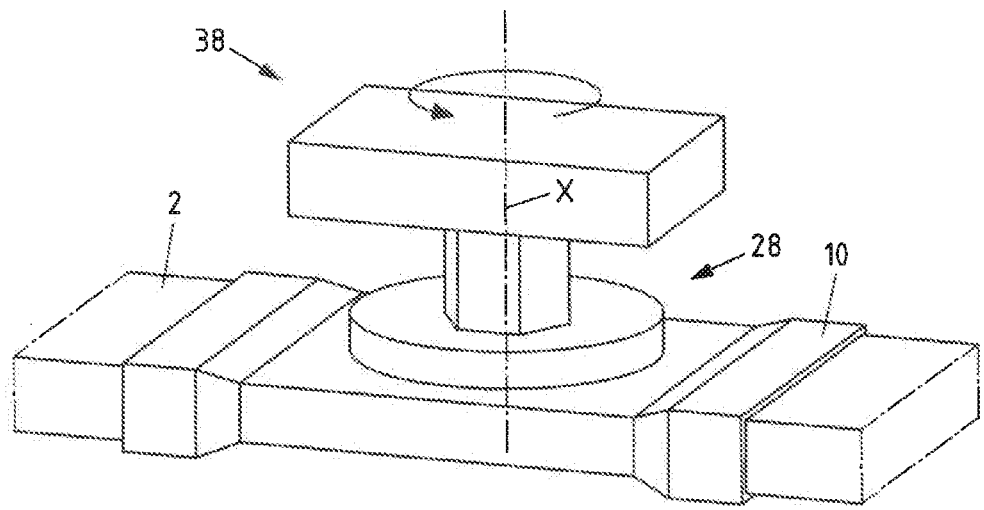

Subsequently, the friction welding mandrel 38a is set into rotation, whereby at the same time a contact pressure force is exerted on the surface of the sleeve 10 in the direction of the axis X. By the rotation and the contact force the contact sleeve 28 is welded to the sleeve 10. This is shown in FIG. 11b.

Subsequently, a contact part, e.g. a connecting bolt, may be pushed through the through-opening 30 and connected to the contact sleeve. The contact part may be screwed into the through-opening 30, fixed in the through-opening 30 in a clamping manner or connected to the contact sleeve 28 in the through-opening 30 in a material bond.

Figure 12:
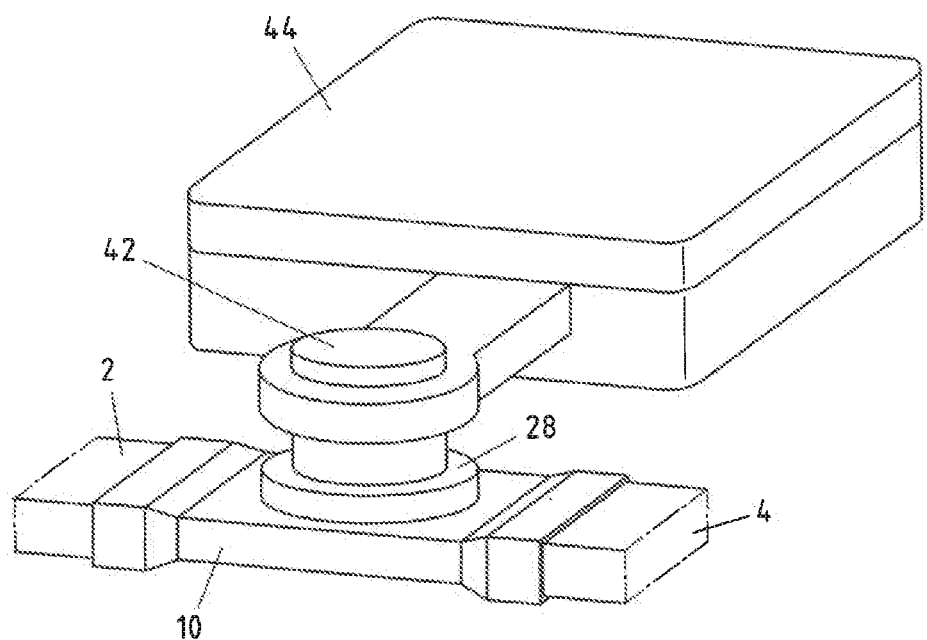
FIG. 12 a connection console with a fuse box.

FIG. 12 shows a view of such a connection. A connecting bolt 42 is connected to the sleeve 10 and the conductor 4 via the contact sleeve 28. In addition to the connecting bolt 42, a fuse box 44 is shown in FIG. 12. The fuse box 44 is connected to the bolt 42 via an electrical conductor. The electrical conductor is screwed or clamped to the bolt 42, for example, and thus provides an electrical connection to the conductor 4. The electrical potential of the conductor 4 may thus be tapped in the fuse box 30 and outlets to the loads may branch off from there.

With the help of the connection console shown, a particularly simple electrical tap of an energy line is possible. The power line as such is merely influenced electrically and its line resistance remains essentially unaffected by the number of connection consoles. Furthermore, the connection consoles may be provided at the desired positions along the line, so that a decentralised distribution of the energy in the on-board network is possible. Several fuse boxes and outlets may be connected to the power cable at different points within the vehicle in a particularly easy manner, depending on what is required. The cable may thus be individually adapted to suit a particular type of vehicle.

What is claimed is:

1. Electrical connection terminal for a motor vehicle wiring comprising:
   a cable with a metallic stranded conductor, and
   an electrical tap electrically and mechanically connected with the stranded conductor, wherein
   the tap is formed from a metallic sleeve,
   the sleeve is connected with the stranded conductor in a connection region of the stranded conductor and
   the sleeve has a longitudinal extension in a longitudinal axis parallel to a longitudinal axis of the stranded conductor,
   the sleeve has a recess, of which the longitudinal axis is oriented transversely to the longitudinal axis of the sleeve, and
   a contact sleeve is arranged in the recess, and
   the sleeve is welded to the stranded conductor in a material bond, wherein
   the contact sleeve is formed from at least two sections wherein a first section is made from a first metal and a second section made from a second metal, different than the first metal, wherein the second section is in contact with the stranded conductor and the second metal is equal to the metal of the stranded conductor and the contact sleeve has a through-opening, and wherein the contact sleeve is welded to the stranded conductor and the sleeve.

2. Electrical connection terminal according to claim 1, wherein
the sleeve is pressed in the connection region in such a way that the sleeve has two contact surfaces running essentially parallel to one another and the recess extends between the contact surfaces.

3. Electrical connection terminal according to claim 2, wherein
at least one edge length of the pressed sleeve is greater than the diameter of the conductor, in particular greater than the diameter of the cable.

4. Electrical connection terminal according to claim 2, wherein
the pressed sleeve has a square or rectangular shape.

5. Electrical connection terminal according to claim 1, wherein
a connecting bolt is arranged in the through-opening.

6. Electrical connection terminal according to claim 1, wherein
the contact sleeve is formed from at least two sections which are arranged next to one another in the axial direction of the contact sleeve, wherein a first section has a first outer circumference and a second section has a second outer circumference which is larger than the first outer circumference.

7. Electrical connection terminal according to claim 6, wherein
the second section is formed as a flange, in particular with a radially projecting collar, the flange lies against a contact surface of the sleeve, in particular wherein the flange is welded to the sleeve in a material bond.

8. Electrical connection terminal according to claim 6, wherein
the first section is connected to the strands of the stranded conductor in a material bond, in particular friction-welded.

9. Electrical connection terminal according to claim 1, wherein
the cable has an insulation of the stranded conductor, the connection region is arranged in a stripped region arranged between two insulation sections of the insulation, and the sleeve is connected to the stranded conductor in the connection region in a material bond.

10. Electrical connection terminal according to claim 9, wherein
the insulation completely encloses the stranded conductor in the insulation sections.

11. Electrical connection terminal according to claim 1, wherein
the stranded conductor is a round conductor and/or the stranded conductor is formed from aluminium or an alloy thereof.

12. Electrical connection terminal according to claim 1, wherein
the sleeve, in parts a connecting bolt and the stranded conductor are sheathed with an insulation material, wherein the insulation material extends over the insulation of the stranded conductor.

* * * * *